Patented Nov. 26, 1946

2,411,671

UNITED STATES PATENT OFFICE 2,411,671

MINERAL OIL COMPOSITION RESISTANT TO FOAMING

Herschel G. Smith, Wallingford, and Troy L. Cantrell, Lansdowne, Pa., assignors to Gulf Oil Corporation, Pittsburgh, Pa., a corporation of Pennsylvania No Drawing. Application March 12, 1945, Serial No. 582,402

7 Claims. (Cl. 252—32.5)

This invention relates to improved mineral oil compositions resistant to foaming.

In lubricating machinery and other devices with oils, in handling oils as by pumping, in handling oil under reduced pressures and in transmitting power with an oil medium, conditions are often such that the oil is subjected to violent agitation in the presence of air or other gases; conditions such as to produce foam or froth. In most cases foaming or frothing is quite objectionable. For example, in crankcases of internal combustion engines or in the lubrication of gears the foaming produced by the churning of the gears gives rise to excessive leakage, improper lubrication, and loss of lubricant past retainer rings, etc. Gears such as those used in transmission and differential gear assemblies often operate at very high speeds, as well as under high tooth pressures; therefore they require a very good lubricant to prevent or retard excessive wear due to surface-to-surface contact.

The lubricants employed usually are viscous oils, often containing a so-called extreme pressure agent to assist in maintaining an oil film between the teeth; sulfurized sperm oil is an especially good pressure carrying agent. If the lubricant contains air dispersed through it, it lacks proper film forming properties. In reduction gears, particularly herringbone gears, oil aerofoam is undesirable as it tends to produce pitting or corrosion at the point of maximum pressure. Moreover, foaming oil is usually much less effective in conducting heat away from the working zone. These difficulties are often aggravated by the fact that some extreme pressure agents present in the oil actually increase the foaming characteristics of the composition.

Foaming is also objectionable in other situations; for example, in compounding oils with extreme pressure agents and other additives, an operation involving thorough agitation. Nearly all petroleum oils foam to some extent under violent agitation. The more viscous oil, the greater the amount of foam, and the longer it persists after agitation is stopped.

In pumping oils with rotary gears, displacement, or other type pumps, foam or gas pockets often interfere with the pumping of the oil, causing a reduction in the stream of oil flow. This condition may be caused by either the vacuum on the intake or by the entrainment of gas due to violent agitation. In placing oil under vacuum, it sometimes is found that the foaming characteristic of the oil is such as to cause loss of oil entrained in the gas removed. This loss of oil is objectionable. For example, as an airplane climbs to high altitudes, the temperature and pressure of the oil in the sump and oil lines may be decreased, conditions which promote foaming tendencies which are highly undesirable.

Another field of use is in oils used in so-called fluid drives or in hydraulic drives or systems. With these types of oils which are often of viscosity as low as SAE 10 grade, agitation may produce considerable foam, even though the foam subsides very quickly on ceasing agitation. Our new agents are also useful in cutting oils and quenching oils and indeed in any oil or oily composition whether used as a lubricant or not.

Several methods for preventing the foaming of mineral oils have been proposed heretofore. The procedure has been to prepare a comparatively unstable product, emulsions which separate free oil which acts somewhat as a foam suppressor. Another method is to add aluminum stearate to the oil; these methods have objectionable characteristics.

Among the objects of our invention is provision of a mineral oil composition resistant to foaming, and a method of suppressing the foaming of mineral oils and oil compositions and other inhibited lubricating compositions which are characterized by a decreased tendency to foam or froth under severe conditions.

We have discovered a class of compounds which are effective as inhibitors in lubricating oil compositions in reducing the foaming tendency of mineral oils, salts of an alkyl alkylene diphosphate having the following general formula:

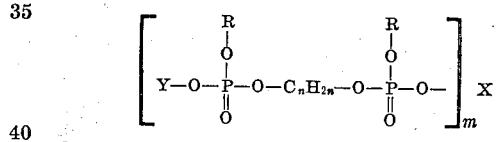

wherein R represents an alkyl group containing 1 to 18 carbon atoms, Y is a substituent of the class consisting of monovalent metals and alkyl groups, X represents a substituent of the class consisting of metals and an organic ammonium group derived from the class consisting of heterocyclic nitrogen bases and dialkylaryl amines, $m$ is a number corresponding to the valence of X, and $n$ is from 2 to 6.

The monovalent metal represented in one embodiment of the above formula by Y may be any element selected from group I of Mendelyeev's Periodic Table of Elements. However, the metals preferably used are sodium and potassium. Y may also represent an alkyl group containing from 1 to 18 carbon atoms in the above general formula for an alkyl glycol phosphate salt.

X may be a cyclic nitrogen base salt which has as a nucleus alkyl substituted cyclic amines having one or more rings, such as aniline, dimethylaniline, pyridine, nicotine, furazan and the like. The alkyl groups attached to the nitrogen of the cyclic nitrogen base salt may be hydrogen or other alkyl groups of any reasonable length or configuration, but the longer chains give increased solubility of the compound in oil. Furthermore, X may represent an alkyl group containing from 1 to 18 carbon atoms, providing Y is a monovalent metal.

As to the "dihydric alcohol or glycols," the generic formula given is as follows:

$$C_nH_{2n}(OH)_2$$

That is, the glycols contain two hydroxyl groups joined together by a "bivalent alkylene" radical. Thus, the structural formula may be written as follows:

$$HO-C_nH_{2n}-OH$$

wherein $n$ represents the number of carbon atoms in the alkylene radical; $n$ usually being 2 to 6, as shown in the specific examples of the known glycol compounds.

Some of the specific glycol compounds useful in our invention may be described as follows:

ETHYLENE GLYCOL

There is only one ethylene glycol (dihydroxy ethane). This compound has the following formula:

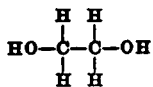

It is typical of the glycols used in making the improvement agents of the present invention.

PROPYLENE GLYCOLS

There are two propylene glycols, namely, alpha-propylene glycol and beta-propylene glycol; they being the "two" isomeric forms of this compound. The alpha-propylene glycol is "propane-1:2-diol" and has the following formula:

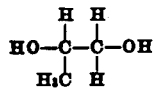

That is, it is a methyl substituted ethylene glycol wherein one of the hydrogens of ethylene glycol has been replaced with a methyl group.

On the other hand, beta-propylene glycol is "propane-1:3-diol" and has the following formula:

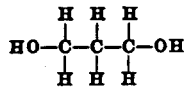

That is, it contains a straight chain alkylene group connecting the two hydroxyl groups thereof.

In other words, there are two types of higher homologues of ethylene glycol; namely, the straight chain glycols and the branched chain glycols. Thus, the butylene glycols and other higher alkylene glycols can be divided into two subclasses on this basis.

BUTYLENE GLYCOLS

Of the several butylene glycols, the "-butylene glycol" or "butane-1:4-diol" having the following formula

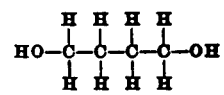

is the simplest one of these compounds, it being a straight chain compound.

The other "butylene glycols" are branched chain compounds. For instance, 1:3-butylene glycol has the following formula:

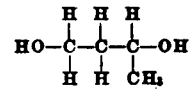

That is, it is a methyl substituted derivative of betapropylene glycol wherein the methyl group is substituted for one of the hydrogens thereof. The other branched chain "butylene glycols" are methyl derivatives of ethylene glycol. For instance, "2:3-methyl-butane-2:3-diol" or "pinacone" has the following formula:

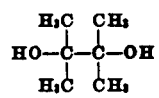

It is also known as "tetramethyl-ethylene glycol"; the four hydrogens of ethylene glycol being substituted with methyl groups. Obviously, other methyl substituted ethylene glycols are possible in addition to the pinacone and alpha-propylene glycols mentioned ante.

As a class, such methyl substituted ethylene glycols may be represented by the following formula:

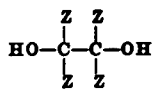

wherein Z represents hydrogen or a methyl group. That is, the above formula also includes ethylene glycol (the parent substance) when all the Z's are hydrogen. On the other hand, when all the Z's are methyl groups, the compound is then pinacone, the highest member of this subclass; the total number of carbons in this compound being 6.

In fact, the specific examples mentioned on these pages contain six or less carbon atoms. For instance, various amylene and hexyleneglycols are also known. However, while the two subgeneric formulas given ante cover the higher homologues of ethylene glycol, including the methyl substituted derivatives thereof, and the higher straight chain compounds, respectively, neither of them include 1:3-butylene glycol which is a methyl substituted derivative of beta-propylene glycol. Thus, we must rely on the broad generic formulae for glycol to cover this compound in making our glycol-phosphate antifoam agents.

The generic formula for the glycols in this invention is represented by the following formula:

$$HO-(C_nH_{2n})-OH$$

wherein $n$ is a number from 2 to 6. The above generic class includes two important major subclasses, namely, the straight chain compounds and the branched chain compounds. The advantageous straight chain compounds are the subclass A as follows:

*Subclass A (straight chain compounds)*

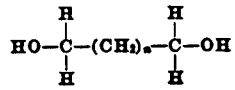

wherein *n* is 2 to 6. Typical species illustrative of this class are as follows:

| | | |
|---|---|---|
| Ethylene glycol | HO—CH₂—CH₂—OH | ethane diol |
| Propylene glycol | HO—CH₂—(CH₂)—CH₂—OH | propane-1:3-diol |
| Butylene glycol | HO—CH₂—(CH₂)₂—CH₂—OH | butane-1:4-diol |
| Amylene glycol | HO—CH₂—(CH₂)₃—CH₂—OH | |
| Hexylene glycol | HO—CH₂—(CH₂)₄—CH₂—OH | |

The above straight chain glycols are useful in making the improved agents of the present invention. Likewise, the isomeric compounds which contain a branched chain alkylene group are also useful for this purpose, particularly those of the subclass B post.

*Subclass B (methyl-substituted ethylene glycols)*

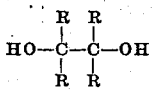

wherein R represents a substituent of the class consisting of hydrogen or alkyl groups. The following compounds are illustrative of this advantageous subclass of glycols:

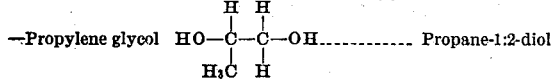

The above compounds are representative of a methyl-substituted ethylene glycol wherein one or more hydrogen is replaced with a methyl group. Further, other methyl-substituted alkylene glycols are also useful for the present purposes, as shown in subclass C below.

*Subclass C (methyl-substituted propylene glycols)*

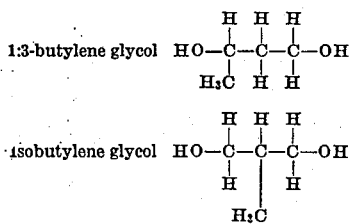

The above compounds are illustrative of the methyl-substituted propylene glycols and those containing two or more methyl groups substituted for the hydrogens of the propylene radical are also useful in making the improvement agents of the present invention.

The glycol-phosphate compounds described above may be prepared in various ways, but in preparing anti-foam agents of this type, certain procedures have been found to be advantageous. Certain of these advantageous procedures are illustrated by the following typical detailed methods and are not intended to limit the scope of the invention.

EXAMPLE I

The potassium trioctyl-ethylene diphosphate prepared according to the procedure described more fully in detail hereinbelow had the following formula:

```
        K
        |
        O
        |
H—C—O—P—O—C₈H₁₇
H       ||
        O

O
        ||
H—C—O—P—O—C₈H₁₇
H       |
        O
        |
        C₈H₁₇
```

The above compound was prepared as a concentrated solution in oil; the concentrate contained approximately equal parts by weight of oil and anti-foam agent. The detailed procedure employed was as follows:

62 lb. of ethylene glycol and 390 lb. of octyl alcohol (2-ethyl hexanol) were added to a suitable vessel and the temperature brought to 100° F. To this mixture 306 lb. of phosphorus oxychloride (POCl₃) were added over a period of two hours at such a rate to allow the hydrochloric acid evolved to escape from the reaction mixture without flooding the reflux condenser. The reaction mixture was then slowly heated at such a rate as to raise the temperature 25° F. per hour until it reached 300° F. At this point the reaction mixture was cooled at 200° F., and a solution of potassium bicarbonate was added to hydrolyze the residual chlorine and to neutralize the acidity developed during the hydrolysis. The product obtained from this reaction was then dissolved in an equal weight of mineral Coastal oil having a viscosity of 100 seconds at 100° F. SUV, then passed through a filter to remove the salt and other impurities developed in the reaction. The recovered solution comprised mineral oil, potassium tri-octyl ethylene diphosphate.

An aviation and automotive lubricant was inhibited with 0.05 per cent by weight of potassium tri-octyl ethylene di-phosphate, prepared according to the above procedure. The addition of the aerofoam inhibitor to the following oil did not change the inspection properties very much, as is noted from the following table:

| | Base oil | Inhibited with 0.05% by weight of potassium tri-octyl ethylene di-phosphate |
|---|---|---|
| Gravity, ° API | 26.3 | 26.3 |
| Viscosity, SUV: | | |
| 100° F | 1,845 | 1,841 |
| 210° F | 119.9 | 118.7 |
| Flash, OC, ° F | 535 | 535 |
| Fire, OC, ° F | 610 | 610 |
| Pour, ° F | 0 | +5 |
| Color, NPA | 5.5 | 5.5 |
| Carbon residue, percent | 0.54 | 0.46 |
| Neutralization No | 0.05 | 0.08 |

However, the foaming tendency of the oil was reduced greatly as shown by the following tests:

*Gulf No. I foam test*

| Composition | Straight oil | Improved oil containing 0.05% of potassium tri-octyl ethylene di-phosphate |
|---|---|---|
| At end of stirring: | | |
| Temperature, ° F | 80 | 78 |
| Volume of oil and foam, cc | 785 | 519 |
| Ratio of volume of oil and foam / volume of original oil | 1.570 | 1.038 |
| Nature of foam | Coarse | Fine |
| After 1 hour standing: | | |
| Temperature, ° F | 79 | 78 |
| Volume of oil and foam, cc | 557 | 500 |
| Ratio of volume of oil and foam / volume of original oil | 1.114 | 1.000 |
| Nature of foam | Coarse | None |

EXAMPLE II

The percentage of inhibitor of Example I was increased from 0.05 per cent by weight on the oil of potassium tri-octyl ethylene di-phosphate to 0.10 per cent by weight on the oil. The oil aerofoam evaluation data of the blank oil and the improved oil were as follows:

Gulf No. 1 foam test

| Composition | Straight oil | Improved oil containing 0.10% by weight of potassium tri-octyl ethylene di-phosphate |
|---|---|---|
| At end of stirring: | | |
| Temperature, °F | 80 | 80 |
| Volume of oil and foam, cc | 785 | 500 |
| Ratio of volume of oil and foam / volume of original oil | 1.570 | 1.000 |
| Nature of foam | Coarse | None |
| After 1 hour standing: | | |
| Temperature, °F | 79 | 79 |
| Volume of oil and foam, cc | 557 | 500 |
| Ratio of volume of oil and foam / volume of original oil | 1.114 | 1.000 |
| Nature of foam | Coarse | None |

EXAMPLE III

The following was the method employed in the preparation of a dimethylaniline tri-octyl ethylene di-phosphate anti-foam agent having the following formula:

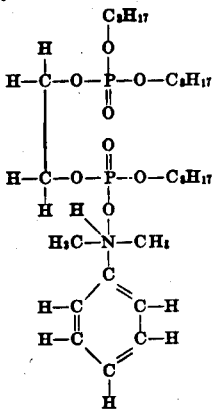

To a suitable vessel 340 lbs. of well refined mineral oil falling into the SAE 30 lubricating oil classification were added, and to the oil were added 142 lbs. of phosphorous pentoxide ($P_2O_5$); and the mixture was well stirred to secure a slurry of the oxide in the oil. Into another vessel 62 lbs. of ethylene glycol and 390 lbs. of octyl alcohol were added. The oil suspension of phosphorous pentoxide was then slowly added at the rate of 50 per cent per hour to the alcohol solution, so as to secure a smooth reaction of the phosphorous pentoxide with the alcohol-glycol mixture. The temperature was held between 140° and 160° during addition of the oil suspension of the phosphorous pentoxide. This reaction mixture was then raised to 200° F. and maintained at this temperature while stirring for two hours, in order to complete the reaction. This mixture was then cooled to 150° F. and 122 lbs. dimethylaniline were added over a period of one hour and the temperature was maintained between 160° and 180° F. The material was then passed through a filter to clarify the reaction mixture.

To the highly refined viscous oil described in Example I was added 0.05 per cent by weight of dimethylaniline tri-octyl ethylene diphosphate prepared according to the procedure described hereinabove in this example. The properties of the inhibited oil were not changed by the addition of this minor amount of oil aerofoam inhibitor.

The following foam test results show the effectiveness of our oil aerofoam inhibitor:

Gulf No. 1 foam test

| Composition | Straight oil | Improved oil containing 0.05% by weight of dimethylaniline tri-octyl ethylene diphosphate |
|---|---|---|
| At end of stirring: | | |
| Temperature, °F | 80 | 78 |
| Volume of oil and foam, cc | 785 | 519 |
| Ratio of volume of oil and foam / volume of original oil | 1.570 | 1.038 |
| Nature of foam | Coarse | Fine |
| After 1 hour standing: | | |
| Temperature, °F | 79 | 78 |
| Volume of oil and foam, cc | 557 | 500 |
| Ratio of volume of oil and foam / volume of original oil | 1.114 | 1.000 |
| Nature of foam | Coarse | None |

EXAMPLE IV

The preparation of potassium dimethylaniline di-octyl ethylene diphosphate was as follows:

To a suitable vessel 62 lbs. ethylene glycol and 260 lbs. octyl alcohol were added and brought to a temperature of 100° F., and 306 lbs. of phosphorous oxychloride were added to this mixture at the rate of 25 per cent per hour; and the temperature was maintained below 160° F. After the addition of the phosphorous oxychloride, the temperature of the reaction mixture was gradually increased to 300° F. over a period of eight hours. At this point live steam was admitted to the reaction mixture to hydrolyze the residual chlorine contained in the phosphorous. Then the temperature was allowed to drop to 212° F. After hydrolysis, the product was partially neutralized with 56 lbs. of potassium hydroxide contained in a water solution (131 lbs. water). The partially neutralized material was then heated to 240° F. to free the reaction mixture from water; the temperature of the reaction mixture then dropped to 18° F., and 120 lbs. dimethylaniline were added to complete the reaction. The mixture was then pumped out through filter-aid filter to remove impurities resulting from the reaction of the recovered reaction mixture which was ready then for use.

To the oil described in Example I was added 15 per cent by volume of a diluted sulfurized sperm oil. This superior extreme pressure lubricant was admixed with 0.05 per cent by weight potassium dimethylaniline di-octyl ethylene diphosphate. The properties of the two oils were as follows:

| | Oil containing 15% by volume of sulfurized sperm oil | Improved oil containing 0.05% by weight of potassium dimethylaniline dioctyl ethylene diphosphate |
|---|---|---|
| Gravity, °API | 25.8 | 25.7 |
| Viscosity, SUV: | | |
| 100° F | 1,341 | 1,351 |
| 210° F | 105.9 | 106.5 |
| Flash, OC, °F | 460 | 465 |
| Fire, OC, °F | 550 | 540 |
| Pour, °F | +15 | +15 |
| Color, NPA | 5.5 | 5.5 |
| Carbon residue, percent | 0.52 | 0.48 |
| Neutralization No | 0.98 | 0.92 |
| Sulfur, percent | 1.32 | 1.30 |

The improved oil containing the 0.05 per cent by weight of potassium dimethylaniline di-octyl ethylene diphosphate was evaluated with Gulf No. 1 foam test and the data were as follows:

Gulf No. 1 foam test

| Composition | Oil containing 15% by volume of sulfurized sperm oil | Improved oil containing 0.05% by weight of potassium dimethylaniline dioctyl ethylene diphosphate |
|---|---|---|
| At end of stirring: | | |
| Temperature, °F | 79 | 79 |
| Volume of oil and foam, cc | 709 | 550 |
| Ratio of volume of oil and foam / volume of original oil | 1.418 | 1.100 |
| Nature of foam | Coarse | Fine |
| After 1 hour standing: | | |
| Temperature, °F | 79 | 79 |
| Volume of oil and foam, cc | 576 | 500 |
| Ratio of volume of oil and foam / volume of original oil | 1.152 | 1.000 |
| Nature of foam | Coarse | None |

Gulf No. 2 foam test

| Composition | Oil containing 15% by volume of sulfurized sperm oil | Improved oil containing 0.05% by weight of potassium dimethylaniline dioctyl ethylene diphosphate |
|---|---|---|
| At end of stirring: | | |
| Temperature, °F | 79 | 79 |
| Volume of oil and foam, cc | 950 | 575 |
| Ratio of volume of oil and foam / volume of original oil | 1.90 | 1.15 |
| Nature of foam | Coarse | Fine |
| After 1 hour standing: | | |
| Temperature, °F | 75 | 78 |
| Volume of oil and foam, cc | 650 | 500 |
| Ratio of volume of oil and foam / volume of original oil | 1.30 | 1.00 |
| Nature of foam | Coarse | None |

Example V

An aviation and automotive lubricant was inhibited with 0.05 per cent by weight of disodium dioctyl isobutylene diphosphate, prepared by reacting one mole of isobutylene glycol and two moles of sodium hydroxide with two moles of phosphorous pentoxide and two moles of octyl alcohol according to the procedure used in Example III. The addition of the aerofoam suppressor to the oils did not appreciably change the physical properties of the oil, as is shown by the following tests:

| | Base oil | Improved oil containing 0.05 percent by weight of disodium dioctyl isobutylene diphosphate |
|---|---|---|
| Gravity, °API | 26.3 | 26.3 |
| Viscosity, SUV: | | |
| 100° F | 1,845 | 1,842 |
| 210° F | 119.9 | 118.9 |
| Flash, OC, °F | 535 | 535 |
| Fire, OC, °F | 610 | 610 |
| Pour, °F | 0 | +5 |
| Color, NPA | 5.5 | 5.5 |
| Carbon residue, percent | 0.54 | 0.44 |
| Neutralization No | 0.05 | 0.05 |

FOAM TEST, GULF NO. 1

| At end of stirring: | | |
|---|---|---|
| Temperature, °F | 80 | 78 |
| Volume oil and foam, cc | 785 | 514 |
| Ratio of volume of oil and foam / volume of original oil | 1.570 | 1.028 |
| Nature of foam | Coarse | Fine |
| After 1 hour standing: | | |
| Temperature, °F | 79 | 78 |
| Volume of oil and foam, cc | 557 | 500 |
| Ratio of volume of oil and foam / volume of original oil | 1.114 | 1.000 |
| Nature of foam | Coarse | None |

FOAM TEST, GULF NO. 3

| At end of 10 min. bubbling: | | |
|---|---|---|
| Volume of oil, cc | 460 | 341 |
| Ratio of volume of oil and foam / volume of original oil | 2.00 | 1.05 |

As is shown in the above data our foam inhibitors are effective in many types of oils, both uncompounded and compounded. Foaming of oils depends more on the type of oil, the type of processing which it has been through, and the inhibitors placed therein than on the actual viscosity of the oil at various temperatures. The above examples show our foam inhibitor to be effective in various types of oils having other pressure carrying and antioxidant agents therein. Moreover, the foam inhibitors of this invention are effective at various temperatures normally encountered in engine operation or other conditions to which the oil might be subjected, as shown by the foam tests described more fully hereinbelow.

To evaluate the foaming tendency of petroleum oils and compositions a test was devised which affords an exceptionally accurate indication of the comparative foaming tendencies. A sample of oil is subjected to very drastic foaming conditions under a standardized procedure which makes it possible to determine quantitatively the tendency of the oil to foam and the stability or permanency of the foam produced. In general, this test is similar to a method employed by the General Motors Corporation for determining the foaming tendencies of gearing lubricants, but has been modified in the direction of greater accuracy and in order to make it possible to record more comprehensive test data. These tests are employed by Gulf Oil Corporation and are referred to as "Gulf foam tests."

In order to have a standard of comparison, the oils with or without the anti-foam agent should be subjected to the same specific tests. There are several tests in use, but the ones we find are to be relied upon to determine the foaming or non-foaming characteristics of oil, and which will give exceptionally accurate indications are as follows:

GULF FOAM TEST NO. 1

An agitating means is provided which is an adaptation of an ordinary commercial motor-driven household mixer, a "Sunbeam Mixmaster" Model 5, manufactured by the Flexible Shaft Company, Chicago, Illinois. The device employed in the test is the usual household model with two slight changes: the turntable of the usual household mixer is replaced by a rigid platform, and a cylindrical brass container having an inside diameter of 7 inches and an inside height of 4 inches is substituted for the usual household glass mixing bowl. The container is fitted with a gage for measuring the depth of oil or oil and foam therein before and after agitation.

The agitator device itself comprises a pair of motor driven beaters which are of the concave outside surface type as described in U. S. Patent 2,161,881, each beater having a pair of blades of the type indicated and being so positioned with respect to each other that the two pairs of beater elements are at right angles and rotate in opposite directions in closely spaced, overlapping paths. In operating position, the beaters are perpendicular to the base of the mixer, as shown in U. S. Patent 2,161,881. In the present test they are centered in the container, and the bottom of the beaters is spaced approximately 1/16 inch from the bottom of the pan when the latter is positioned on the rigid platform. With 500 cc. (±5 cc.) of oil in the container which is level, the beaters are submerged in the initial oil sample so that the bottoms of the beaters are 1/16 of one inch from the bottom of the pan.

The measured sample of 500 cc. (± 5 cc.) of oil is brought to a temperature of 77° F. (± 1° F.) and the container is then placed in operating position with the beater elements lowered into operating position. The motor is started and adjusted to a speed of 550 R. P. M. controlled within ± 10 R. P. M. The beaters agitate the oil and beat air into the sample. Agitation is continued for exactly 15 minutes.

The motor is now stopped. The foam level is determined, and the temperature of the sample is measured, the beaters are removed from the oil, and any oil or foam adhering to the beaters is permitted to drain into the container, which takes one or two minutes. It is then possible to calculate the ratio of the volume of oil and foam to the volumes of the original oil, with correction for any temperature changes. The container is removed and allowed to stand free from drafts for one hour, measured from the time the stirring is stopped. The volume and temperature measurements are taken again, and serve to indicate stability or permanence of the foam produced.

The test procedure may, of course, be varied, as for example, by changing the volume of the sample, the speed of agitation or the time of agitation, or by taking the final measurements at an earlier or later period. The inhibited oil may be agitated at higher temperatures than 77° F., depending on the service conditions to which the oil may be applied. It is sometimes found that some oils will foam at higher temperatures even with the aerofoam inhibitor, while they will not foam at lower temperatures. Such is usually the case with the dispersed type of oil aerofoam inhibitor. However, in the test referred to in the specific example above, the procedure was precisely as indicated.

GULF FOAM TEST NO. 2

More violent agitation may be employed if a still more drastic test is required, as is the case in Gulf foam test No. 2 which uses a higher speed of rotation, namely 900 R. P. M., but is similar in the other respects to Gulf foam test No. 1. In some very low viscosity oils considerable foam may develop during agitation, which disappears very quickly when agitation is stopped. These conditions are found, for example, in marine turbine lubricating systems (which use light oils) at the point where the returned oil is discharged rapidly into a reservoir.

GULF FOAM TEST NO. 3

In Gulf foam test No. 3 a brass air distributing mat, containing a No. 40 filter paper, distributes 10 liters of air per hour uniformly through about 230 cc. of oil in a one liter graduate. Air is bubbled through the 230 cc. of oil maintained at 77° C. for a period of 10 minutes. The nature and the amount of foam are observed and recorded.

The present invention covers the incorporation of glycol esters of substituted acid of phosphorus in a mineral oil, imparting new, unpredictable, and highly desirable properties to the composition. These new properties render the compounded oil particularly useful for various purposes; although the decreased tendency of the compounded oils to foam has been emphasized throughout the specification, it is to be understood that our invention is not limited to this feature, and that different compounds of the general type herein described vary in their degree of effectiveness and may impart one or more other desirable properties to the lubricating composition. For example, the compounds described hereinabove inhibit the corrosion of alloy bearings and at the same time reduce the amount of wear produced as compared with a straight uncompounded mineral oil. Moreover, the compounds described hereinabove have mild detergent properties which are advantageous for certain types of lubrication. In general, the compounded oils disclosed in our invention have better anti-foam, anti-oxidant, oiliness, pressure carrying, and anti-ring sticking properties than the same type of uncompounded oils.

It will be apparent to those skilled in the art that our invention is not limited to the details or examples given hereinabove for clearness and understanding only, and no unnecessary limitations should be understood therefrom, but may variously be practiced and embodied within the scope of the appended claims.

What we claim is:

1. A mineral oil composition resistant to foaming comprising a major amount of a mineral oil and an amount at least sufficient to reduce the foaming tendency of said oil of a salt of an alkyl alkylene diphosphate having the following formula:

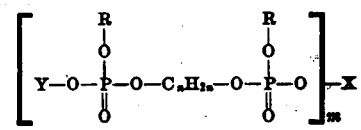

wherein R represents an alkyl group containing 1 to 18 carbon atoms, Y is a substituent of the class consisting of monovalent metals and alkyl groups, X represents a constituent of the class consisting of metals and an organic ammonium group derived from the class consisting of heterocyclic nitrogen bases and dialkylaryl amines, $m$ is a number corresponding to the valence of X, and $n$ is 2 to 6.

2. The composition of claim 1 wherein the proportion of said salt of an alkyl alkylene diphosphate is between 0.01 and 1.0 per cent by weight of the composition.

3. The mineral oil composition of claim 1 wherein said salt of an alkyl alkylene diphosphate is potassium tri-octyl ethylene diphosphate.

4. A mineral oil composition resistant to foaming comprising a major amount of mineral oil and an amount at least sufficient to reduce the foaming tendency of said oil of a mixed salt of an alkyl alkylene diphosphate having the following formula:

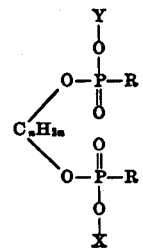

wherein $C_nH_{2n}$ represents an alkylene group, $n$ is from 2 to 6, Y represents a monovalent metal, R represents alkyl groups containing 1 to 18 carbon atoms, and X represents an organic amine selected from the class consisting of dialkylanilines and heterocyclic nitrogen bases.

5. The composition of claim 4 wherein the proportion of the mixed salt of an alkyl alkylene diphosphate is between 0.01 and 1.0 per cent by weight of the composition.

6. The mineral oil composition of claim 4 wherein the mixed salt of an alkyl alkylene diphosphate is potassium dimethylaniline di-octyl ethylene diphosphate.

7. The mineral oil composition of claim 1 wherein said salt of alkyl alkylene diphosphate is disodium di-octyl isobutylene diphosphate.

HERSCHEL G. SMITH.
TROY L. CANTRELL.